SIMPLIFIED HORIZONTAL DYNAMIC CONVERGENCE CIRCUIT

Filed March 11, 1968 2 Sheets-Sheet 1

Inventor:
JOHN KENNETH ALLEN

BY Eugene M. Whitacre
Attorney

March 10, 1970 J. K. ALLEN 3,500,113

SIMPLIFIED HORIZONTAL DYNAMIC CONVERGENCE CIRCUIT

Filed March 11, 1968 2 Sheets-Sheet 2

Inventor:
JOHN KENNETH ALLEN

By Eugene M. Whitacre

Attorney

United States Patent Office 3,500,113

Patented Mar. 10, 1970

3,500,113
SIMPLIFIED HORIZONTAL DYNAMIC CONVERGENCE CIRCUIT

John K. Allen, Indianapolis, Ind., assignor to RCA Corporation, a corporation of Delaware Filed Mar. 11, 1968, Ser. No. 712,073
Int. Cl. H01j 29/50, 29/70
U.S. Cl. 315—13 10 Claims

ABSTRACT OF THE DISCLOSURE

A horizontal convergence circuit for color television receivers has a pair of series connected horizontal convergence windings which are driven from a source providing a sawtooth voltage at the horizontal line deflection frequency. The parameters of the circuit are such that the inductance of the windings integrate the sawtooth voltage from the source to provide a parabolic current therethrough. The same source develops a sawtooth of current across a potentiometer, a portion of the sawtooth current being injected at the junction between the two windings to differentially shift the phase of the parabolic current flowing through the two windings.

Figure 1:
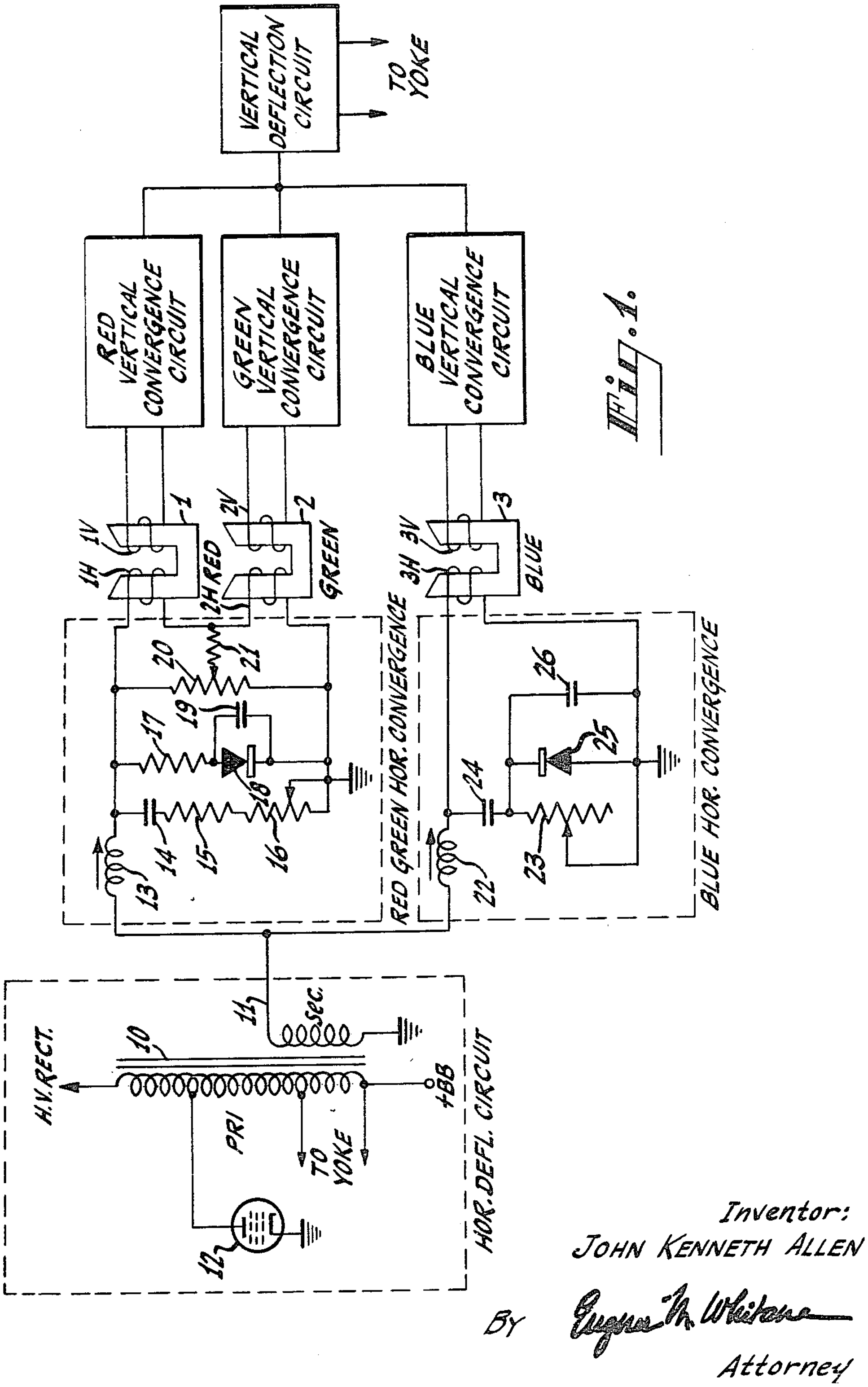

This invention relates to dynamic convergence circuits for multi-electron beam display devices such as a multi-beam color kinescope.

Most color kinescopes currently in commercial use include three electron guns positioned in the neck of the kinescope. The three electron guns produce beams of electrons which pass through the neck of the kinescope where they are deflected by a magnetic deflection yoke field to scan the kinescope target screen. Intermediate the screen and the neck of the kinescope, there is located an aperture mask which intercepts the electron beams and allows electrons to pass through only at the apertures. Immediately behind each aperture is arranged a group of three phosphor dots capable of producing green, red, and blue light when struck by electrons. Depending on the angle of approach of the electrons passing through the aperture mask those electrons from one gun will strike the green phosphor dots and those electrons from one of the other guns will strike the red phosphor dots and the electrons from the remaining gun will strike the blue phosphor dots. Thus the guns are designated as the red, green, and blue guns in that they each scan the screen and produce the three separate primary color images to be displayed to produce a full color image. Therefore, these three color images must be in superposition at all points of the screen in order to provide an accurate high definition image.

Superposition of the striking points of the three beams on the screen requires dynamic as well as static correction means and is generally referred to as convergence. Static convergence means are provided to converge the three beams at screen center when the deflection yoke fields are zero. However, under the influence of the yoke deflection fields the three beams pass through different portions of the yoke field and are deflected differently. The greater the deflection the greater is the misconvergence of the beams at the screen. To correct this misconvergence, additional correction of a dynamic type dependent on vertical and horizontal deflection must be provided. It is, therefore, customary to provide dynamic electro-magnetic means, in conjunction with the electron beam paths prior to horizontal and vertical deflection, for correcting the misconvergence of the beams as a function of angular deflection of the beams from the center of the kinescope screen. For this purpose current waveforms of a generally parabolic shape are derived from the horizontal and vertical deflection circuits and are employed in conjunction with three convergence electro-magnets to dynamically converge the three beams at all points of the scanned area of the kinescope screen. The wave forms employed must have the proper shape in order to achieve good convergence of the three beams at all points of the kinescope screen.

Dynamic convergence circuits require careful adjustment in order to provide the proper amplitude and wave shape to converge the beams at all points on the screen. To facilitate this adjustment procedure, circuits have been designed whereby an adjustment made to produce beam convergence at the left of the screen is not upset by the adjustments made to converge the beams on the right side. Furthermore such adjustments for the right and left sides can be made without upsetting the static center convergence. One such circuit is described in Patent No. 2,903,622, granted Sept. 8, 1959, to J. C. Schopp. These features of the prior art have made the convergence of a color television kinescope a procedure which is well within the skill of a television serviceman.

It is an object of this invention to provide an improved convergence circuit of reduced complexity by which the beams of a multi-beam kinescope are converged for the horizontal scan direction.

And it is also an object of this invention to provide an improved convergence circuit means wherein adjustments made to establish convergence at one edge of the screen do not affect adjustments previously made at the other edge of the screen.

A convergence system in accordance with the teachings of this invention includes two convergence windings positioned with respect to the beam paths of a multi-beam kinescope to effect radial deflection of the respective beams. The two convergence windings are connected in series and receive deflection frequency convergence current waveforms from a single drive circuit. A resistive potentiometer is connected across the pair of convergence windings and the junction of the windings is connected to a wiper of the potentiometer. The convergence windings integrate the sawtooth voltage from the drive circuit to develop a parabolic current through them. By the proper choice of the convergence winding inductance and the resistance of the potentiometer, the currents through the windings may be differentially altered with respect to each other by adjustment of the tap on the potentiometer. A component of sawtooth current flowing in the potentiometer may be added to one winding and subtracted from the other and vice versa. In this way, the resultant current through the convergence winding is a variable combination of parabola and sawtooth current in a differential manner as the result of the application of a single driving source to the pair of windings.

Figure 2A:
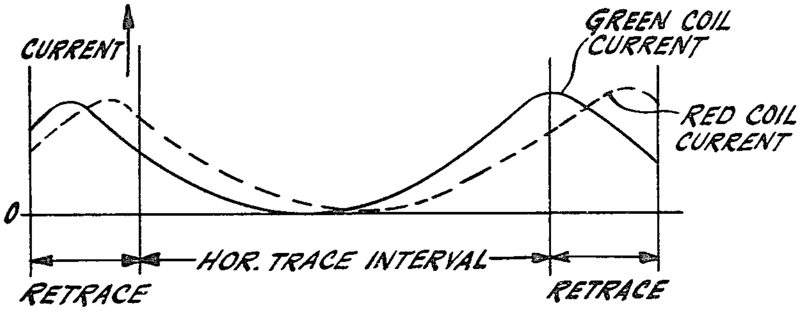
Figure 2B:
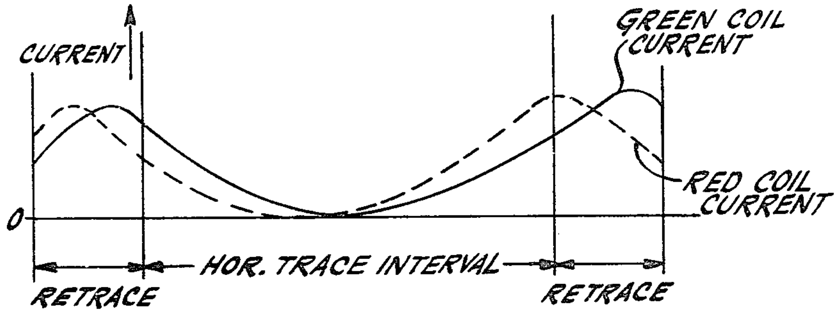

A more detailed description of the invention together with additional features and advantages thereof will be made with reference to the accompanying drawings in which:

FIGURE 1 is a schematic circuit diagram of a convergence circuit embodying the present invention;

FIGURES 2*a* and 2*b* are graphs of current waveforms in the convergence windings which will be referred to in describing the operation of the invention; and FIGURES 3*a* and 3*b* are diagrammatic representation of the scanning paths followed by the red and green electron beams for different adjustment settings of the convergence circuit shown in FIGURE 1.

Referring now to the drawings, FIGURE 1 shows a schematic circuit diagram of a convergence system wherein horizontal convergence energy is derived from a horizontal deflection circuit including a deflection and high voltage transformer 10 by means of a secondary winding 11. The deflection transformer 10 is driven by a drive tube 12 and coupled to a deflection yoke, not shown. The deflection circuit is adapted to deflect the three electron beams of a shadow mask color kinescope. At the same time, convergence of the three beams both horizontally and vertically is accomplished by positioning three electromagnets 1, 2 and 3 in proximity to the electron beam paths. The electromagnets 1, 2 and 3 each comprise a ferrite core and two windings, a horizontal control winding 1H, 2H and 3H and a vertical control winding 1V, 2V and 3V. The vertical control windings of the electromagnets 1, 2 and 3 are energized by a red, green and a blue vertical convergence circuit which receive vertical frame rate drive signals from the vertical deflection circuit. The horizontal control windings of the electromagnets 1, 2 and 3 are energized by a red-green horizontal convergence circuit and a blue horizontal convergence circuit as shown in FIGURE 1 within the dotted outlines and are correspondingly named.

The red-green horizontal convergence circuit includes an adjustable inductor 13 coupling horizontal deflection frequency pulses from the horizontal deflection transformer secondary 11 to the series connection of the control windings 1H and 2H of the red and green convergence electromagnets. A ground return is provided to connect the convergence control windings to the deflection transformer secondary 11. Connected across the series connected control windings 1H and 2H is a parallel combination of three current paths. One of these paths comprises a capacitor 14 series connected with a resistor 15 and an adjustable resistor 16. A second of these current paths consists of a resistor 17 and a rectifying diode 18. The third path comprises a potentiometer 20 with an adjustable wiper connection.

The adjustable inductor 13 is proportioned so that the pulse voltage coupled from transformer secondary 11 is integrated into a sawtooth shaped voltage waveform as developed across the three parallel current paths. The current path comprising the diode 18 and the resistor 17 conducts only for one polarity of the sawtooth waveform appearing across it and provides a net direct current flow through it and the electromagnet control windings 1H and 2H. The sawtooth of voltage developed across the three parallel paths is also across the series connected control windings. Since these windings have a high inductance to resistance ratio and, therefore, high quality factor (Q) they integrate the saw tooth voltage applied to them and develop a parabola of current to effect convergence.

The rectified current in the control windings 1H and 2H serves to clamp the trough of the parabola of current to a fixed value such that static center convergence will not change as a function of control adjustments. The rectified current produced by the diode 18 finds a return path through the control windings 1H and 2H, the potentiometer 20, and the series combination of variable inductor 13 and transformer secondary 11. Of these, the potentiometer is the highest resistance and conducts very little of the rectified current. The windings 1H and 2H are 10 ohms D-C resistance each, and the inductor 13 has a comparable or larger resistance component. Therefore a substantial portion of the rectified current is caused to flow through the control windings 1H and 2H. It should be noted that an isolation capacitor is not used in series with the variable inductor 13 by means of the judicious choice of the resistance values of the components of the circuit. For a more detailed description of convergence waveform current clamping refer to the Schopp patent referred to above.

The variable inductor 13 provides a master amplitude control of the parabola of current flowing in the control windings 1H and 2H in that an adjustment of the inductor core changes the inductance and therefore the sawtooth of current flowing into the three parallel impedance paths. During the first half of scan, the diode 18 and resistor 17 are the controlling impedances of the three paths in that the polarty of the sawtooth voltages is appropriate for diode 18 conduction. For the latter half of scan the diode is non-conducting and, therefore, its branch path is of very high impedance. At this time the branch path including capacitor 14, resistor 15 and variable resistor 16 is the controlling low impedance path. Therefore, an adjustment of the variable resistor 16 will adjust the amplitude of the sawtooth during the latter half of scan to the virtual exclusion of the first half of the scan period.

The series connected control windings 1H and 2H are connected across the potentiometer and have a common connection between them. A resistor 21 is connected between the common connection of the two control windings 1H and 2H and the wiper of the potentiometer 20. The potentiometer 20 resistance and the connecting resistor 21 together are made comparable to or larger than the reactive impedance of an individual control winding. If by way of contrast the total resistance of the potentiometer 20 and resistor 21 are made very low relative to the reactance of the windings 1H, 2H, then the potentiometer 20 would control the division of the sawtooth voltage supplied to the control windings 1H, 2H and adjustments of the potentiometer 20 would control the division of parabolic current amplitude in the windings 1H, 2H. However, in the present circuit, where the potentiometer 20 and connecting resistor 21 have a high total resistance value, a different result is achieved.

A sawtooth current flows through the potentiometer 20. When the wiper is at midposition on the potentiometer 20, no current will flow in resistor 21 because of the symmetry of the circuit. When the wiper is moved away from the midposition a sawtooth current flows in the resistor 21. The direction of the sawtooth current depends on which way the wiper is moved from the midposition. Because of the relative magnitudes of resistance of resistor 21 and potentiometer 20, the resultant sawtooth current through the resistor 21 also flows as a sawtooth component of current in the windings 1H and 2H. The sawtooth components in the two windings are in opposite polarity directions, and add to the parabola of current in the windings in a manner which appears to shift the phase of the parabolic currents in opposite directions. FIGURE 2*a* shows the parabolic currents in the windings 1H and 2H when the wiper is moved toward the non-grounded end of the potentiometer 20, and FIGURE 2*b* shows the corresponding currents when the wiper is moved toward the ground end of the potentiometer. Therefore, the sawtooth current flow provides an effective differential tilt of the horizontal beam scans and adjustments of potentiometer 20 cause equal and opposite movements of the red and green beam scans.

In the ideal kinescope-yoke combination, an equal magnitude of parabola current is required in each electromagnet for red and the green convergence. Furthermore, ideally equal magnitude sawtooth currents are required for tilt correction; however, the tilt for one beam scan must be of the opposite phase to the other when like phase parabola are applied to the control coils. In the circuit shown in FIGURE 1, the same phase parabola is applied to the control windings 1H and 2H in series connection. Also the tilt sawtooth current generated by the asymmetry of conduction in the diode branch is applied to the control coils in series. Therefore, like phase tilt resulting from the asymmetrical sawtooth voltage is applied to both control windings. The differential tilt potentiometer 20 then provides the required phase of sawtooth in the windings with respect to the required corrections mentioned above.

In adjusting the convergence circuit shown in FIGURE 1, the first step is to adjust the inductor 13, which controls amplitude of the parabolic current in the windings 1H and 2H. During the set-up procedure at is desirable to use a cross-hatch generator to produce a pattern of substantially equally spaced vertical and horizontal lines on the face of the kinescope. The inductor 13 is adjusted to align the vertical red and green lines on the left hand side of the screen, which lines correspond to the first half of the horizontal scanning lines.

The second step is to adjust the master tilt control potentiometer 16 to align the vertical red and green lines on the right hand side of the screen, which lines correspond to the last half of the horizontal scanning lines. As mentioned above the adjustment of the potentiometer 16 does not materially affect the alignment of the vertical lines on the left hand side of the screen.

The third adjustment is the differential tilt control potentiometer 20 which is set to align the horizontal red and green lines.

Figure 3:
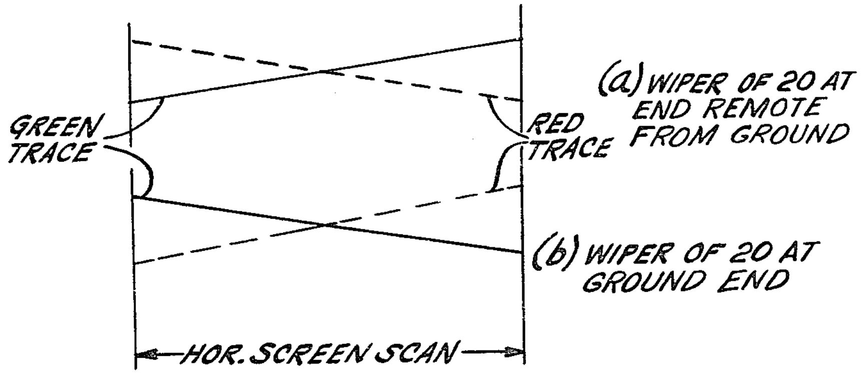

FIGURE 3 shows two extreme degrees of movement of the scans of the red and green beams as provided by the potentiometer 20. FIGURE 3*a* shows the red scan high on the left and low on the right while the green scan is low on the left and high on the right for the condition of the potentiometer 20 wiper displaced to the end of the potentiometer remote from ground. FIGURE 3*b* shows the reverse condition, green high on the left, red high on the right when the potentiometer 20 wiper is displaced to the ground end of the potentiometer. At a point intermediate of the potentiometer, the red and green scan lines will merge horizontally. Perfect superposition will depend upon both lines being straight or both being curved the same way, in which case a differential parabola correction is not needed. Errors have been observed with small size shadow mask kinescopes of a magnitude less than a beam width and been deemed to be acceptable.

FIGURE 1 shows a blue horizontal convergence circuit connected to the secondary 11 of the horizontal deflection circuit and to a control winding 3H of a blue convergence electromagnet 3. The circuit is driven by the same transformer secondary winding 11 as the red-green convergence circuit without the usual direct current isolation capacitor in series with the horizontal pulse source. The rectified direct current provided by diode 18 in the red-green convergence circuit is prevented from passing into the blue horizontal convergence circuit by the low resistance of the secondary winding 11 of the horizontal output transformer 10. The actual circuit used is the same as a blue horizontal deflection circuit disclosed in an issued patent to R. R. E'del, Patent No. 3,187,218, issued June 1, 1965. The direct current clamp diode for clamping the trough of the parabola has been omitted since experience shows that if the blue center static convergence does move, then it is very easy to make the blue line parallel to the merged red-green scan and then reset the blue center static convergence. The reader is reminded that the brightness of blue is very low and it is easier to distinguish when it is separated from the relatively bright red-green merged line. The blue convergence circuit as disclosed by R. R. E'del provides an improved waveform suited to wide angle deflection kinescopes and also provides independent convergence adjustment at the screen edges.

The following table lists the values of the components in the circuit of FIGURE 1.

Inductor 13—2.0–5.5 mh.
Inductor 22—2.0–5.5 mh.
Windings 1H, 2H, 3H—2.2 mh.
Capacitor 14—0.15 $\mu$f.
Capacitor 19—1000 $\mu\mu$f.
Capacitor 24—0.15 $\mu$f.
Capacitor 26—1000 $\mu\mu$fd.
Resistor 15—82Ω 1 watt
Resistor 17—82Ω ½ watt
Resistor 21—82Ω ½ watt
Potentiometer 16—250Ω
Potentiometer 20—350Ω
Potentiometer 23—60Ω
Diode 18—100 ma. silicon diode
Diode 25—200 ma. silicon diode

What is claimed is:

1. A convergence circuit for a multi-beam kinescope of the type including,
- means providing a convergence waveform source providing a voltage wave having a substantially sawtooth shape,
- first and second serially connected convergence windings coupled across said source to receive said sawtooth wave, the inductance of said windings being of a value relative to the other parameters of said circuit to convert said sawtooth voltage wave to a current having a substantially parabolic shape,
- a potentiometer coupled in parallel with said serially connected convergence windings,
- a slider on said potentiometer,
- means coupling said slider to the junction of said convergence windings,
- the resistance value of the circuit between the junction of said convergence windings and the other terminal of either of said windings being of a value to cause the parabolic current waveforms to shift in opposite directions with respect to time when said slider is adjusted.

2. A convergence circuit for a multibeam kinescope as described in claim 1 wherein;
- said means providing a convergence waveform source is a single ended two terminal source providing one polarity of sawtooth shape waveform with respect to a reference potential.

3. A convergence circuit for a multibeam kinescope as described in claim 2 wherein;
- said potentiometer is direct current connected in parallel with said serially connected convergence windings.

4. A convergence circuit for a multibeam kinescope as described in claim 3 wherein;
- said potentiometer and said serially connected convergence windings are directly connected to the convergence waveform source providing a voltage wave having a substantially sawtooth shape.

5. A convergence circuit for a multibeam kinescope as described in claim 4 wherein;
- said means coupling said slider to the junction of said convergence windings includes a resistor to determine the minimum resistance presented across said convergence windings.

6. A convergence circuit for a multibeam kinescope as described in claim 5 wherein;
- said means coupling said slider to the junction of said convergence winding provides a direct current connection.

7. A horizontal convergence circuit for color television receivers comprising,
- a pair of input terminals for connection to a source of pulses recurring at the horizontal deflection frequency for said receiver,
- a pair of convergence windings and a master amplitude controlling inductor connected in series in the order named between said input terminals,
- a first series circuit comprising a capacitor, and a variable resistor connected across said pair of convergence windings,
- a second series circuit comprising a resistor and a diode connected across said pair of convergence windings,
- a potentiometer having a slider connected across said pair of convergence windings, and
- a resistor connected between said slider and the junction between said convergence windings.

8. A convergence circuit for a multi-beam kinescope of the type including,
- means providing a convergence waveform source providing a voltage wave having a substantially sawtooth shape, first and second serially connected convergence windings having a common junction connection, a resistance network having three terminals, one of said terminals being connected to the junction of said serially connected convergence windings, the remaining terminals of said resistance network being respectively connected to opposite ends of said serially connected convergence windings, manually adjustable means for varying the resistance presented between said one terminal of said resistance network and one of said remaining terminals relative to the resistance presented between said one terminal and the other of said remaining terminals, means coupling said series connected windings and said resistance network across said waveform source to receive said sawtooth wave, the inductance of said windings being of a value relative to the other parameters of said circuit to convert said sawtooth voltage wave to a substantially equal parabolic current in each of the windings, the resistance value of the resistance network between the junction of said convergence windings and at least one of said remaining terminals being of a sufficiently large value as to cause the parabolic current waveforms in said windings to shift in opposite directions with respect to time when said manually adjustable means is adjusted.

9. A convergence circuit for a multi-beam kinescope as described in claim 8 wherein;

said waveform source has a first and second terminal, and said means coupling said series connected windings and said resistance network across said waveform source includes only said first and second terminals of said source.

10. A convergence circuit for a multi-beam kinescope as described in claim 8 wherein;

the convergence windings have a high inductance to resistance ratio, and said resistance value is substantially greater than the resistance of the windings and comparable to or larger than the reactive impedance of the windings.

References Cited

UNITED STATES PATENTS

| | | | |
|---|---|---|---|
| 2,875,374 | 2/1959 | Cooper et al | 315—13 |
| 3,114,858 | 12/1963 | Schopp | 315—13 X |

RODNEY D. BENNETT, Jr., Primary Examiner

MALCOLM F. HUBLER, Assistant Examiner